Nov. 22, 1932.  G. M. COFFIN  1,888,221
FISH LURE
Filed March 27, 1929  2 Sheets-Sheet 1
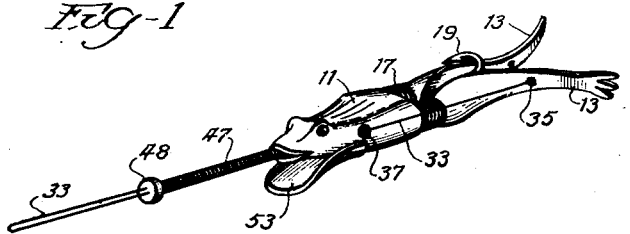
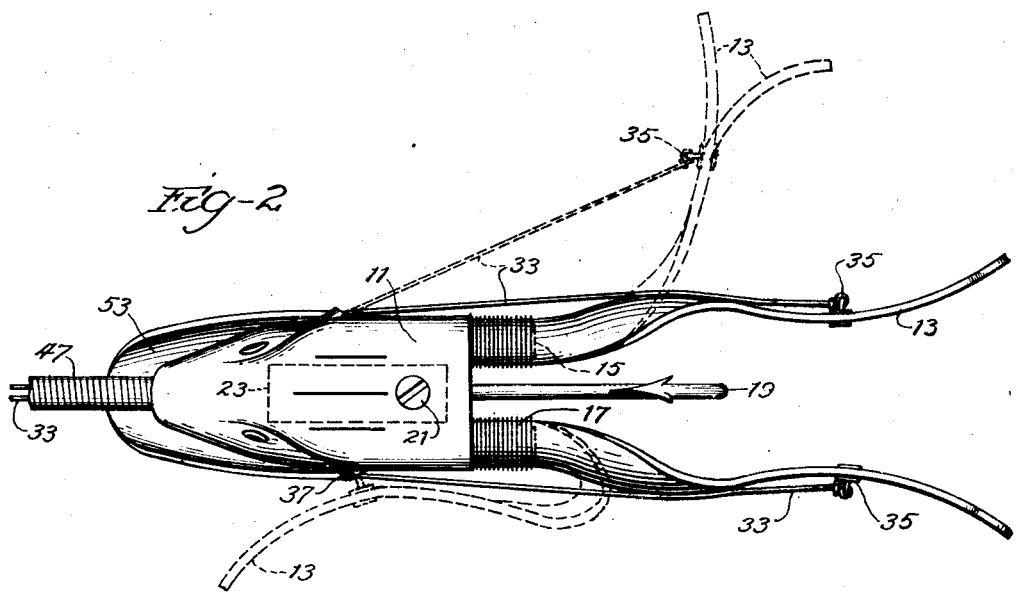
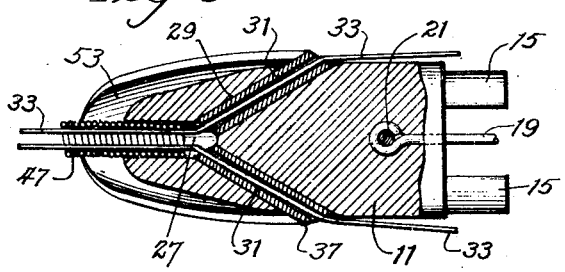
Inventor:-
GEORGE M. COFFIN
By:- Cheever, Cox & Moore
Attys.

Nov. 22, 1932.  G. M. COFFIN  1,888,221
FISH LURE
Filed March 27, 1929  2 Sheets-Sheet 2
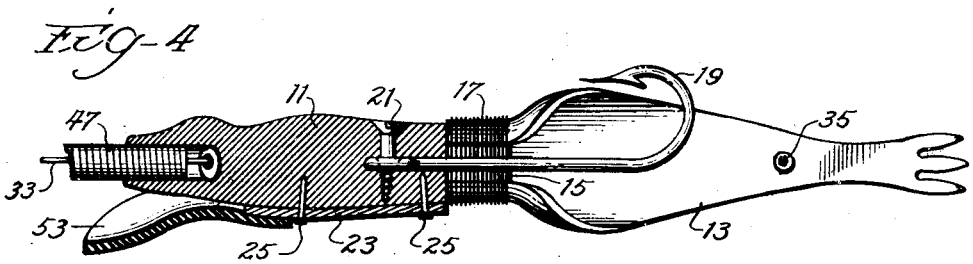
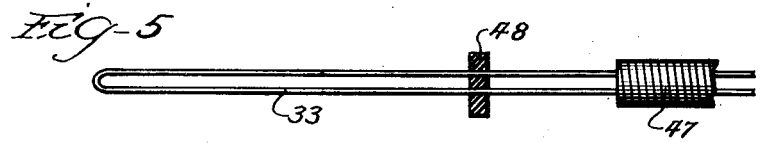
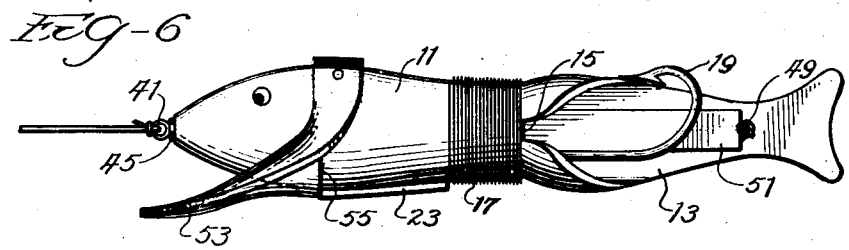
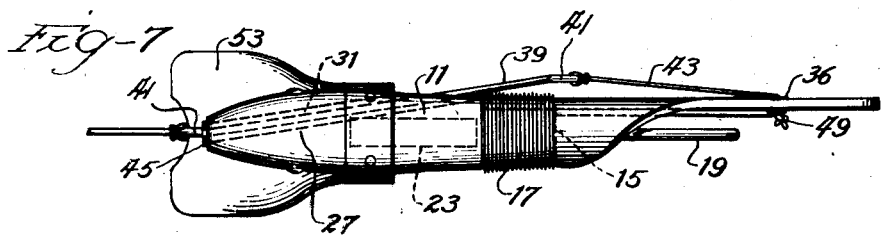
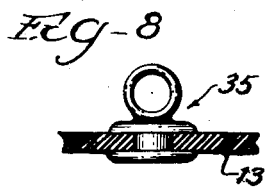
Inventor
GEORGE M COFFIN
By:- Cheever, Cox & Moore
Atty's.

Patented Nov. 22, 1932

1,888,221

UNITED STATES PATENT OFFICE

GEORGE M. COFFIN, OF HINSDALE, ILLINOIS

FISH LURE

Application filed March 27, 1929. Serial No. 350,175.

My invention relates in general to fish lures and has more particular reference to an animated fish lure formed in simulation of a live fish bait and having means for causing the lure to move in a lifelike manner when drawn through the water.

An important object of my invention is to provide an artificial fish lure having means for causing the lure to wriggle and move in a lifelike manner when drawn through the water.

Another important object of my invention is to provide a fish lure having anti-snag means for preventing the lure from catching in submerged obstructions.

Still another important object of my invention is to provide an improved fish lure.

Numerous other objects and advantages of the invention will be apparent as it is more fully understood from the following description which taken in connection with the accompanying drawings discloses a preferred embodiment of the invention.

Referring to the drawings:

Figure 1 is a perspective view illustrating a preferred form of my invention;

Figure 2 is a top plan view of the embodiment illustrated in Figure 1;

Figure 3 is a longitudinal section taken through the forward portions of the embodiment illustrated in Figure 2;

Figure 4 is a vertical section taken longitudinally through the device illustrated in Figure 2;

Figure 5 is a plan view partially in section of the device illustrated in Figure 1 to illustrate means for attaching my fish lure to a fish line;

Figure 6 is a perspective view illustrating a modified embodiment of my invention;

Figure 7 is a top plan view of the device shown in Figure 6; and

Figure 8 is an enlarged view partially in section illustrating a portion of my improved fish lure.

To illustrate my invention I have shown on the drawings a fish lure formed in simulation of the physical characteristics of a live bait, specifically a frog and a minnow. My fish lure comprises a body 11 simulating the body of the live bait, and having a rearwardly projecting flexible portion 13. In the case of the lure simulating the frog, there are two flexible rearwardly extending portions simulating frog's legs in outline, while in the case of the lure simulating the minnow, there is but one rearwardly extending flexible portion simulating the tail of the minnow in outline. The flexible portions 13 are preferably formed of rubber or similar resilient material and are secured to the body by wrapping around the rearwardly projecting stub 15 formed in the body, the flexible members being secured in place by suitable fastening means 17, which in the illustrated embodiment comprises a wire or cord wrapped about the projection over the wrapped ends of the portions 13 in order to secure the flexible members to the stubs 15.

A rearwardly projecting hook 19 is set in the body 11 of the fish lure and is secured in place by any suitable means such as by the wood screw 21, the head of which is suitably countersunk into the body to provide a flush outer surface.

In order that the fish lure may float upright when used in fishing, I provide a balancing weight 23 comprising a strip of relatively heavy material and fastening this strip by suitable means, such as nails 25, to the lower surface of the body 11. Although I have illustrated this balancing means as projecting from the surface of the body, it will of course be apparent that the same may be set into the body to provide a flush body surface.

In order to provide a lifelike fish lure, I have furnished means for moving the flexible members 13 in response to tugs on the fish line to which the bait may be attached, while the same is used in fishing. This means consists in forming a longitudinal channel 27 through the forward end of the body 13, and in extending the fish line through this channel, so that the same may be moved longitudinally in the channel in response to tugs or pulls upon the fish line. The end of this extension is connected to the flexible member 13 at a point spaced from the free end thereof, so that when a pull is exerted upon the fish line, the flexible members will be flapped outwardly and forwardly in a life like manner, the resilience of the flexible material normally urging the member 13 to reassume its normal rearwardly extending position when the tension on the fish line is released. In this manner the flexible member 13 may be moved in a manner closely simulating the movements of the live bait in swimming by merely jerking the fish line.

In the lure simulating the frog or other multi-limbed bait this is accomplished by forming a longitudinal channel 27 in the front end of the body 11, which channel divides and provides a plurality of arms extending from the inner end of the channel 27 to open at the sides of the body 11.

I prefer to line the channels 29 with suitable bushings 31 in order that the forward and rearward travel of the actuating cords will not cut into the body 11, which preferably is formed of wood or similar soft porous floatable material. Cords or strings 33 are threaded through the channel 27 and through the channels 29 and extend rearwardly along the sides of the body and are fastened at their extremities, each to a flexible member 13 at a point spaced from the end thereof. Although any suitable material may be used for the strings or cords 33, I prefer to use bronze wire since this material is strong in tension and cannot readily be cut by the teeth of a fish.

I may attach the cords 33 to the flexible member 13 in any suitable manner, but I prefer to use an eyelet 35 riveted to the flexible member 13, the form and arrangement of the eyelet being shown in Figure 8 of the drawings. The advantage of using such an eyelet resides in the fact that if a fish is hooked, the eyelet 35 will set against the protruding end 37 of the bushing 31 and provide a firm connection between the fish line and the lure to take the strain, which otherwise would be taken by the material of the flexible member 13. The cords or strings 33 project forwardly of the nose of the body 11 and form means for securing the fish lure to a fish line. Where bronze wires are used it is not necessary to provide means for preventing the forwardly projecting cords 33 from being bitten by a hook fish, but if the cords 33 are made of string or similar material, which may be bitten off by a fish, I provide a forwardly extending flexible sheath 47, which may be seated at its rearmost portions in the forward end of the channel 27 and through which the strings 33 may pass. The sheath 47 is projected forwardly sufficiently to protect the strings in the immediate vicinity of the fish lure and the strings 33 thereafter are threaded through a friction washer 48, which by engaging the forward end of the sheath 47 limits the rearward movement of the strings 33, so that by adjusting the washer 48, the position of the flexible members 13 may be adjusted.

In fish lures where but one flexible member 13 is employed, it is not necessary to form several diverging channels 29 in the body of the lure, but a through channel may be formed from the forward tip of the body 11 and opening in the side thereof. This channel also is provided with a suitable lining 31 to prevent the enlargement of the channel due to the fact of the sliding part.

Where a direct channel is employed, I prefer to arrange a shaft 39 in the channel. This shaft is provided with a collar at its forward end to engage the nose of the fish lure to limit the rearward travel of the rod 39. Forwardly of the collar and in the rearward end of the rod, loops 41 are formed in the rod. The forward loop provides means for attaching the fish lure to a fish line and the rearward loop provides means for connecting the cord or string 43, which may be similar in texture to the cords 33 and which extends from the rod 39 to engage the flexible member 13. The free end of the cord 43 may be attached to the flexible member by means for an eyelet similar to the eyelet 35 heretofore described, or may be merely inserted through aperture 36 formed in the resilient material of the member 13, the cord 43 being knotted as at 49 to prevent its disengagement. In this construction it will be noted that the rearward loops 41 of the rod 39 will engage rearward end of the bushing 31 when the fish is hooked to thus take the strain.

In order to prevent the fish lure of my invention from snagging upon submerged obstructions, I provide, at the forward end of the body 11, an anti-snag collar 53, which comprises a forwardly and downwardly projecting resilient apron mounted to the body 11. This apron may be formed of rubber or similar suitable resilient material and may be attached to the body of the lure in any convenient manner. In Figures 6 and 7, I have illustrated a preferred method of attaching my improved anti-snag apron. This is accomplished by forming a slot 55 in the rearmost portions of the strip of material which forms the apron, and threading the body 11 through this slot in such a manner that the rearmost portions of the strip overlie the body while the said portions of the strip which form the anti-snag apron underlie the body and project forwardly and downwardly thereof.

When the lure in being drawn through the water in fishing encounters an obstruction, the forwardly projecting portion or apron will bend and react upon the body of the fish lure to throw the same clear of the obstruction. When the fish lure meets an obstruction, also, the pull on the fish line will throw the resilient members 13 outwardly and forwardly as shown in dotted lines in Figure 2, and when the lure is released from the obstruction as aforesaid, it will appear to jump forwardly, the flexible members simultaneously create the motive urge for said jumps, and in returning to their normal position assist in creating the desired illusion of a live bait.

The anti-snag collar 53 has the additional functions of furnishing a resistance brake or drag, which checks or tends to prevent motion of the lure forwardly through the water, so that when the line to which the lure is attached is jerked, the lure will tend to remain stationary in the water, so that the connecting strings 33 will operate to flex the resilient members 13 as indicated in dotted lines in Figure 2 of the drawings. If the anti-snag collar is omitted the operation of the device may be seriously impaired since the smooth surfaced body of the lure many not offer sufficient resistance to hold the body stationary in the water until the limb members 13 are flexed. If the lure is made of light material and the members 13 are relatively stiff, omission of the apron 53 may cause the lure to function improperly.

It is thought that the invention and numerous of its attendant advantages will be understood from the foregoing description and it is obvious that numerous changes may be made in the form, construction and arrangement of the various parts without departing from the spirit and scope of the invention or sacrificing any of its material advantages, the form herein described being a preferred embodiment of the invention.

Having thus described my invention what I claim as new and desire to secure by Letters Patent is:

1. An animated fish lure comprising a body formed in simulation of a live bait, a flexible member extending rearwardly of the body to simulate a movable extremity of the live bait, a guide formed in said body, means connecting the flexible member to a fish line, said means extending in said guide whereby to cause the flexible member to move in realistic simulation of the natural movements of the live bait when the fish line is tensioned, and a forwardly and downwardly extending resilient member secured to the forward portion of said body, means formed and arranged in the body whereby the lure will float in water with the resilient member in position to engage and be flexed by submerged obstructions which the lure may meet during fishing operations whereby to employ the resilience of the member to throw the lure upwardly of the obstruction thereby causing the same to jump in a lifelike manner whenever an obstruction is met.

2. A fish lure comprising a body formed in simulation of a frog's body, flexible rubber strips secured to the body and extending rearwardly thereof in simulation of the legs of a frog, said body being formed with channels extending from the forward end thereof and opening at points in the sides of the body, members extending in said channels and connected to said rubber strips, said members extending forwardly of the body and being connectible to a fish line, and an apron extending outwardly of said body to form a check means for retarding the forward movement of the fish lure in the water, whereby when the fish line is jerked, the members will be drawn through the channels and the rubber strips will be flexed to substantially simulate the swimming movements of a frog.

3. A fish lure comprising a body configurated to simulate a live bait, a resilient anti-snag apron mounted on the body, said apron being formed of flexible rubber-like material and means mounted on said body to maintain the lure in an upright position when in the water so that the resilient apron will be carried in position to engage submerged obstructions when drawn through the water during fishing operations whereby the apron upon contacting with such obstructions will be stressed so as to throw the lure upwardly of the obstruction and cause the lure to jump in a manner simulating the leap of a live fish bait.

4. A fish lure comprising a body formed in simulation of the forward portion of a fish, a flexible rubber strip secured to the body and extending rearwardly in simulation of the tail of a fish, said body being formed with a channel extending from the forward end thereof and opening at a point in the sides of the body, a connector extending in said channel and secured to said rubber strip at one end and extending forwardly of the body at the other end whereby to form a connection for attachment to a fish line and an apron extending forwardly and downwardly of said body to form checking means for retarding the forward movement of the fish lure in the water whereby, when the fish lure is jerked, the connector will be drawn through the channel and the rubber strip flexed in simulation of the swimming movement of a fish.

5. A fish lure comprising a body formed in simulation of the body of a live bait, a flexible member secured to the body and extending rearwardly thereof in simulation of a movable appendage of the live bait, said body being formed with a channel extending from the forward end thereof through said body, a connector extending in said channel and mounted for longitudinal movement therein, said connector being attached at one end to the flexible member and being formed for connection with a fish line and an apron extending outwardly of said body to form checking means for retarding the forward movement of the fish lure through the water whereby when the fish line is jerked, the connector will be drawn through the channel and the flexible member will be moved in substantial simulation of the swimming movement of the live bait and means mounted on said body to maintain the lure in a substantially upright position when floated in water whereby the apron will be carried in submerged position.

6. A fish lure comprising a body formed in simulation of a live bait, a rubber member forming a rearwardly extending appendage mounted on said body, means for attaching the bait to a fish line, and operating means for moving the appendage laterally in simulation of the natural movements of the live bait when the lure is jerked through the water by the fish line and an apron extending downwardly and outwardly of said body to provide for retarding the forward movement of the fish lure through the water and thus provide reactive means permitting the operating means to function in response to jerking on the fish line and means formed in said body for maintaining the lure in position, when floated in water, carrying the appendage submerged.

7. A fish lure comprising a body formed in simulation of a live bait and a flexible appendage fastened at one end of the body, said appendage extending rearwardly of the body, means for causing the appendage to flex in simulation of the natural movements of the live bait, said lure being connectable to the fish line and a member carried by the body and extending outwardly thereof to form a drag or brake to resist forward movement of the lure through the water so that a pull on the fish line will agitate and cause lifelike movement of the flexible appendage.

8. A fish lure as set forth in claim 7 wherein the outwardly extending member carried by the body is formed of resilient material and is located at the end of the body opposite the appendage and extends forwardly and downwardly to form an anti-snag apron to throw the lure upwardly of submerged obstructions which may be encountered during fishing operations.

In witness whereof, I have hereunto subscribed my name.

GEORGE M. COFFIN.